United States Patent
Yamaguchi et al.

[11] Patent Number: 5,923,395
[45] Date of Patent: Jul. 13, 1999

[54] METHOD OF MANUFACTURING DECORATIVE PLASTIC EYEGLASS ELEMENTS

[76] Inventors: Shigeyoshi Yamaguchi, 26-13-19, Shimonoda-cho; Eizo Onami, 82-banchi-no-3, Dai-2-go, Yoshitani-cho, both of Sabae-shi, Fukui-ken, Japan

[21] Appl. No.: 08/891,702
[22] Filed: Jul. 9, 1997
[30] Foreign Application Priority Data May 7, 1997 [JP] Japan .................................. 9-134292

[51] Int. Cl.⁶ .............................. G02C 11/02; D06P 5/00
[52] U.S. Cl. .................................. 351/51; 351/41; 8/478
[58] Field of Search ........................... 351/41, 51, 52, 351/111; 8/456, 478, 518

[56] References Cited

U.S. PATENT DOCUMENTS 4,986,647  1/1991  Blumenthal ............................. 351/51

FOREIGN PATENT DOCUMENTS 0321424  12/1989  Japan ..................................... 351/51
5-164996   6/1993  Japan .

*Primary Examiner*—Huy Mai
*Attorney, Agent, or Firm*—Edwin E. Greigg; Ronald E. Greigg

[57] ABSTRACT

A method of manufacturing decorative plastic eyeglass elements. The steps of the method comprise dyeing a certain portion of the surface of a plastic eyeglass element with dispersion dye as a first dyeing step, forming aggregated groove patterns comprising a plurality of minute grooves formed on a part of the dyed portion of the plastic elements, and as a second dyeing step, dyeing at least the part of the aggregated groove patterns with dispersion dye having a color which is different from the color of the dispersion dye used in the first dyeing step.

28 Claims, 13 Drawing Sheets

5,923,395

METHOD OF MANUFACTURING DECORATIVE PLASTIC EYEGLASS ELEMENTS

BACKGROUND OF THE INVENTION (1) Field of the Invention

The present invention relates to a method of manufacturing decorative plastic eyeglass elements, such as plastic temples, tips or end covers, ornaments for rims, pads, and so on, in which a pattern of aggregated grooves consisting of minute grooves are formed on a part of a dyed surface of the elements. In the present invention, such tips or end covers for covering the end portion of a metal temple or a reinforcing rod or wire for a resin temple, are defined as a "modern".

(2) Prior Art

Antique style of frames of eyeglasses are popular these years, however, plastic frames have been rarely seen so far. As one of the antique style of decorative eyeglass elements which try to meet the demand, a method of manufacturing resinous eyeglass elements in classical style is presented as published in Japanese patent laid-open publication No. 5-164996.

In this conventional manufacturing method, plastic eyeglass elements are dyed with a color which is different from the color of the resin itself by using a dispersion dye, after which the dye layer is partly abraded or shaved off with a buff so that the undyed layer of resin under the dyed layer is exposed to make a speckled surface as a whole and then elements of eyeglasses after the abrasion are lacquered to a finish.

However, the above-mentioned manufacturing method has the following problems.

Since the above-mentioned manufacturing method is only to expose the undyed resinous layer under the dyed layer by abrasing or shaving off the dyed portion of the elements of eyeglasses with a buff, it simply expresses the even and smooth resinous surface at the abrased portion even though it is a classical style, and therefore it cannot give a subtle touch and feeling to the elements.

Further, by lacquring the elements of eyeglasses after abrasion, the above-mentioned even and smooth abrased surface reflects much, wherefore not only the impression of the decorative portions formed by abrasion is easy to fade, but also the effect of the design is damaged beyond expectations.

SUMMARY OF THE INVENTION

The present invention has been developed in view of the above-mentioned problems and an object of the invention is to present a method of manufacturing decorative plastic eyeglass elements which has more subtle and attractive-looking decorative portions, i.e. which has a touch and feeling of an antique style, for instance.

In order to solve the above-mentioned problems, a method of manufacturing decorative plastic eyeglass elements according to the present invention comprises the steps of dyeing a certain portion of the surface of a plastic eyeglass element with dispersion dye as a first dyeing step, forming aggregated groove patterns consisting of a plurality of minute grooves formed on a part of the dyed portion of the plastic elements, and dyeing at least the part of the aggregated groove patterns as a second dyeing step with dispersion dye having a color which is different from the color of the dispersion dye used in the first dyeing step. In the present invention, the color different from the first dyeing step includes the colors different in lightness and deepness.

In the method, it is preferable to determine the thickness of cut and the depth of the minute groove such that the color of the first dyeing step is left shallow and continuously or intermittently in the longitudinal direction of the groove.

The present invention comprises the steps of dyeing a certain portion of the surface of a plastic element of eyeglasses with dispersion dye as a first dyeing step, cutting and removing away a part of the dyed surface of the plastic element in a certain thickness, forming aggregated groove patterns consisting of a plurality of minute grooves formed on a part of the cut portion of the plastic elements, and dyeing at least the part of the aggregated groove patterns as a second dyeing step with dispersion dye having a color which is different from the color of the dispersion dye used in the first dyeing step. In the present invention, the color different from the first dyeing step includes the colors different in lightness and deepness.

Further, the method of manufacturing decorative plastic eyeglass elements according to the present invention comprises the steps of dyeing a certain portion of the surface of a plastic eyeglass element with dispersion dye as a first dyeing step, and forming aggregated groove patterns consisting of a plurality of minute grooves formed on a part of the dyed portion, wherein the depth of each of the minute grooves is determined such that the bottom portion of the groove locates at a portion of the element which is not dyed.

The present invention comprises practically the steps of dyeing a certain portion of the surface of a plastic eyeglass element with dispersion dye as a first dyeing step of blackish or dark brownish, cutting and removing away a part of the dyed portion in a certain thickness, forming aggregated groove patterns consisting of a plurality of minute grooves formed on the cut portion of the plastic elements,.and dyeing at least the part of the aggregated groove patterns as a second dyeing step with dispersion dye of brownish color.

The present invention comprises practically the steps of dyeing a certain portion of the surface of a plastic eyeglass element with dispersion dye as a first dyeing step of blackish or dark brownish, cutting and removing away a part of the dyed portion in a certain thickness, forming aggregated groove patterns consisting of a plurality of minute grooves formed on the cut portion of the plastic elements, determining the thickness of cut and the depth of the minute groove such that the blackish or brownish color is left continuously or intermittently to extend in the longitudinal direction of the groove, and then dyeing at least the part of the aggregated groove patterns as a second dyeing step with dispersion dye of brownish color.

Further, the present invention comprises practically the steps of dyeing a certain portion of the surface of a plastic eyeglass element with dispersion dye as a first dyeing step of blackish or dark brownish, forming aggregated groove patterns consisting of a plurality of minute grooves formed on the dyed portion of the plastic elements, and then dyeing at least the part of the aggregated groove patterns as a second dyeing step with dispersion dye of brownish color.

As a practical mode, the present invention comprises the steps of dyeing a certain portion of the surface of a plastic eyeglass element, which is formed as a temple, with dispersion dye as a first dyeing step of blackish or dark brownish, cutting and removing away a side wall of an outer side or a side wall of an inner side of the temple along substantially the whole length of the dyed portion in a certain thickness, forming aggregated groove patterns of a stripe pattern by concaving a plurality of minute grooves with the cut portion of the plastic elements to extend in the longitudinal direction of the temple, and at the same time, determining the thickness of cut and the depth of the minute groove such that the blackish or brownish color is left continuously or intermittently to extend in the longitudinal direction of the groove, and then dyeing at least the part of the aggregated groove patterns as a second dyeing step with dispersion dye of brownish color.

As another practical mode, the present invention comprises the steps of dyeing a certain portion of the surface of a plastic eyeglass element, which is formed as a modern part, with dispersion dye as a first dyeing step of blackish or dark brownish, cutting and removing away a side wall of an outer side or a side wall of an inner side of the modern element along substantially the whole length of the dyed portion in a certain thickness, forming aggregated groove patterns of a stripe pattern by concaving a plurality of minute grooves with the cut portion of the plastic elements to extend in the longitudinal direction of the modern element, determining the thickness of cut and the depth of the minute groove such that the blackish or brownish color is left continuously or intermittently to extend in the longitudinal direction of the groove, and then dyeing at least the part of the aggregated groove patterns as a second dyeing step with dispersion dye of brownish color.

In the case that the method includes such a cutting step, it is preferable to form the elements of the eyeglasses to be transparent or translucent, so as to shut off light with the hem formed by the first dyeing step and to make a shade in the inside portion of the hem.

In each of the methods as mentioned above, it is preferable to comprise the steps of forming a solid decorative portion of concave grooves on the surface of the plastic eyeglass element prior to a dyeing step, and then dyeing the solid decorative portion at the same time of dyeing the eyeglass element, wherein the depth of the concave groove is set to form the bottom portion of the concave groove after forming the minute grooves.

The present invention has excellent advantages as mentioned below.

According to the present invention, a part of the dyed portion is cut or shaved off and striped groove patterns consisting of minute grooves are formed on the cut portion, wherefore decorative plastic eyeglass elements can be presented which have subtle decorative portions with gentleness and warmth because of the shadows and diffused reflection of lights appearing at the grooves. Thus, the manufacturing method according to this invention, which is able to give the unique design effect, is distinct from the above-mentioned conventional manufacturing method which is simple-cutting.

②After the decorative plastic eyeglass elements are dyed dark brown or the like, a part of the dyed portion is shaved off or cut and aggregated groove patterns consisting of minute grooves are formed on the surface of the shaved off portion while leaving the above-mentioned blackish or brownish colors in lines on the inner surface of the grooves. When the aggregated groove patterns are further dyed brownish colors, the decorative elements of eyeglasses with high added value can be manufactured at a low cost, which appears to be wooden although they are plastic.

In more detail, in the above-mentioned patterned portions of the aggregated grooves, the depth of the groove becomes more impressive by the shadows of the grooves, and in addition, a strip-like pattern in dark colors is also formed by the blackish and brownish colors left on the inner surface of the grooves. Thus, an impressive grain-like pattern which is very similar to real grain of wood appears on the above-mentioned patterned portions of the aggregated grooves. And the portions of the grain-like pattern have gentleness and warmth similar to a real grain of wood by diffused reflection of lights at the minute grooves. Moreover, the circumference of the above-mentioned grain-like pattern presents a state of hemming in blackish or dark brownish color around the above-mentioned grain-like pattern, and the portion of the hemming looks like bark. Accordingly, although the end cover is plastic, it is finished to present an appearance similar to a wooden end cover as a modern with gentle and warmth.

When the elements of the eyeglasses are molded with transparent or translucent plastic in particular, as a result of the shadows formed inward by the dark hemming the inside of the hemming, the inside of the hemming becomes dark slightly, and the inside of the dark portion, the above-mentioned portion in grain-like pattern is continued. Such a portion consisting of hemming and shadows is blackish or brownish outside, and the color becomes gradually pale inward. This gives an impression which is very similar to the appearance of real bark, and the impression of a wooden modern element becomes stronger.

Even when the decorative elements of the eyeglasses are manufactured in such a way that after the molded plastic elements of the eyeglasses are dyed with dispersion dye in colors different from the colors of the elements of the eyeglasses themselves, the aggregated grooves consisting of minute grooves are formed on a part of the dyed portion (i. e. the condition in which the abovementioned second dyeing step is not carried out), a subtle pattern with gentleness and warmth can be given to the elements of the eyeglasses by the shadows appearing at the minute grooves and by diffused reflection of light at the minute grooves.

When a solid or three-dimensional decorative portion such as a trademark formed by concaves, is formed on the surface of the elements of the eyeglasses prior to the first dyeing step, the trademark and the like can be colored with dye, and at the same time, the color can be left even after the dyed portions are later shaved off, the above-mentioned colored trademark can look embossed. Particularly, when a grain-like pattern is formed at the patterned portions with the aggregated groove patterns and when the trademark and the like consisting of the concaved portioned are blackish or dark brownish color, the colored trademark and the like can look impressively as if they were embossed.

In the patterned portions with the aggregated groove patterns, as the concaved portions are resistant to wear due to the existance of concave and convex, the decorative effect can be maintained for a long period of time. Further, by forming this concave and convex pattern of the aggregated groove patterns at the portion where the elements of the eyeglasses touch skin, it may obtain such a further effect that the eyeglasses are prevented from slipping down due to increase of frictional resistance.

Other advantages of the present invention will be apparent from the description of the embodiments with reference to the drawings.

BRIEF DESCRIPTION OF THE DRAWINGS

The drawings show embodiments of the present invention in which.

DETAILED DESCRIPTION OF THE EMBODIMENTS

The embodiments of the presention will be described below with reference to the drawings.

First embodiment

Figure 1:
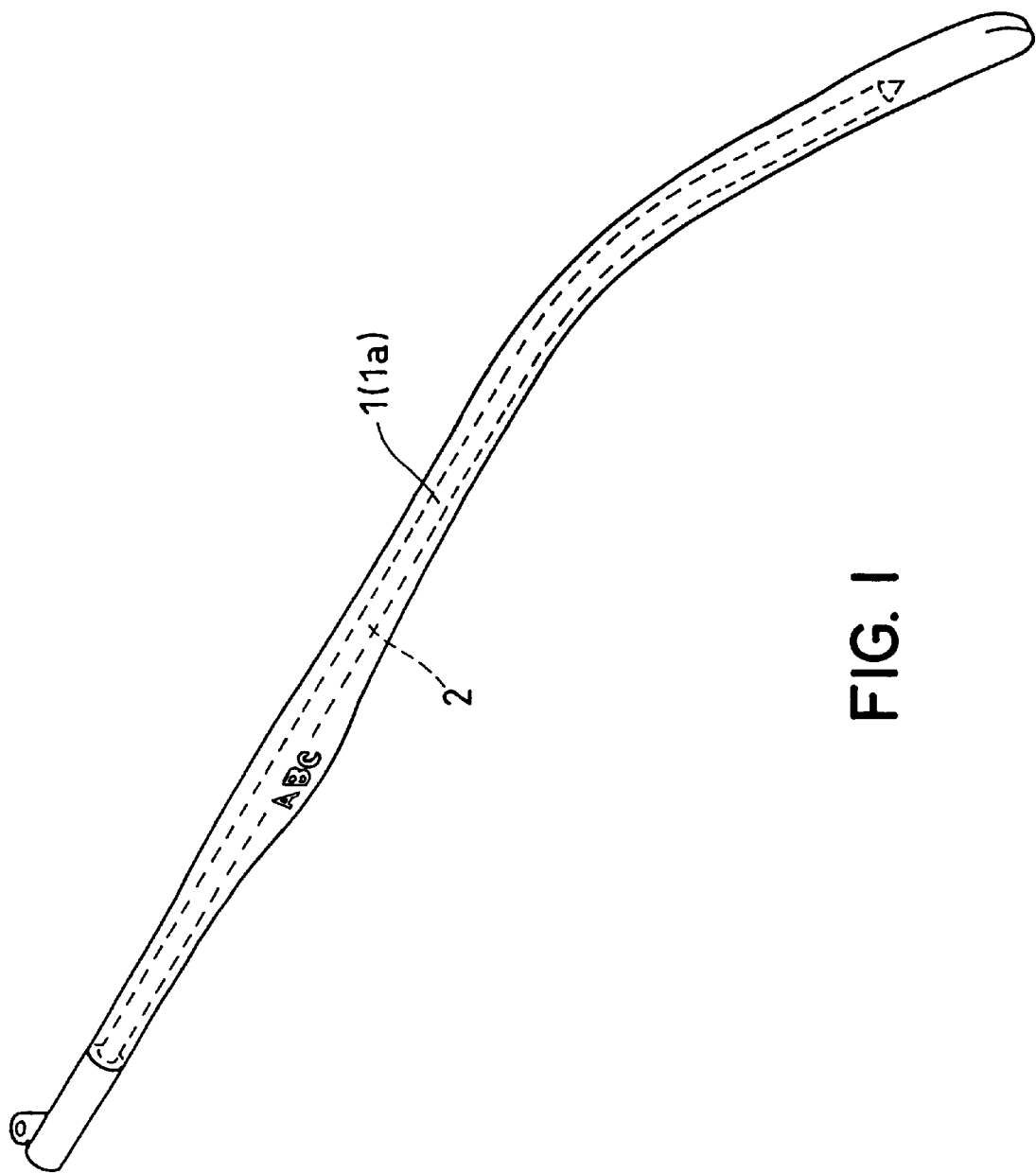
FIG. 1 is a perspective view for explaining a state of using a decorative eyeglass element.
Figure 2:
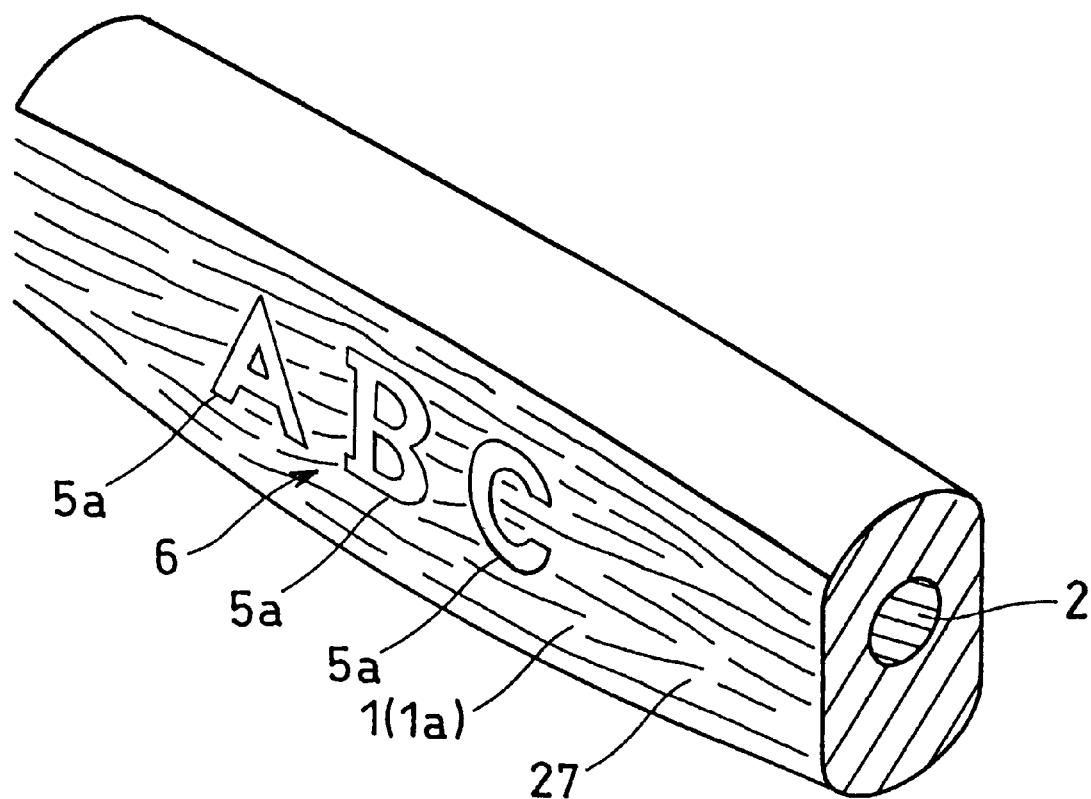
FIG. 2 is a perspective view of a part of the decorative eyeglass element.

FIG. 1 shows an example of a wooden-looking decorative plastic eyeglass element 1 manufactured according to the method of the present invention, in which a core 2 is covered by a decorative modern covering (This term is defined hereinbefore.) 1a, in its full length so that the whole element is decorated to look like a wooden modern element. The state of decoration is shown in FIG. 2, while the state of decoration is omitted in FIG. 1, for the sake of convenience.

Figure 3:
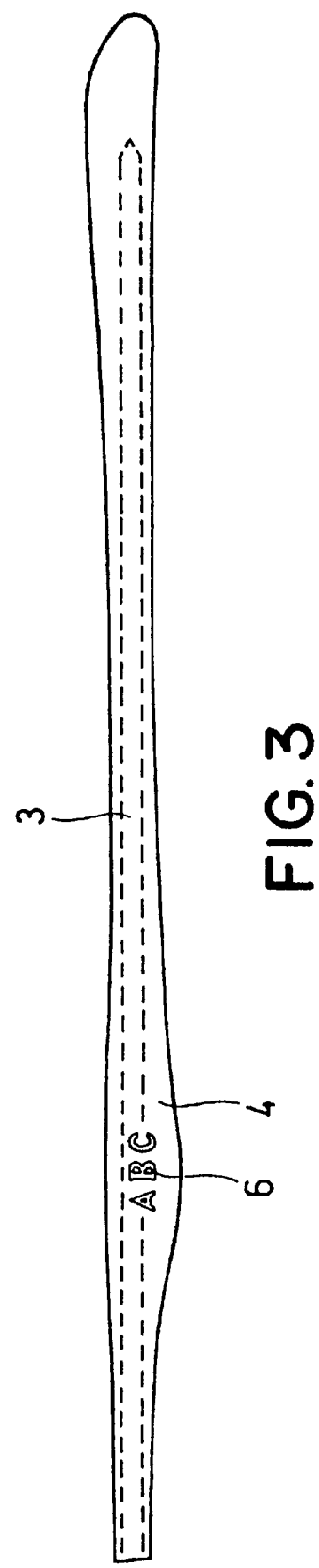
FIG. 3 is a side view showing an eyeglass element as a modern element.
Figure 4:
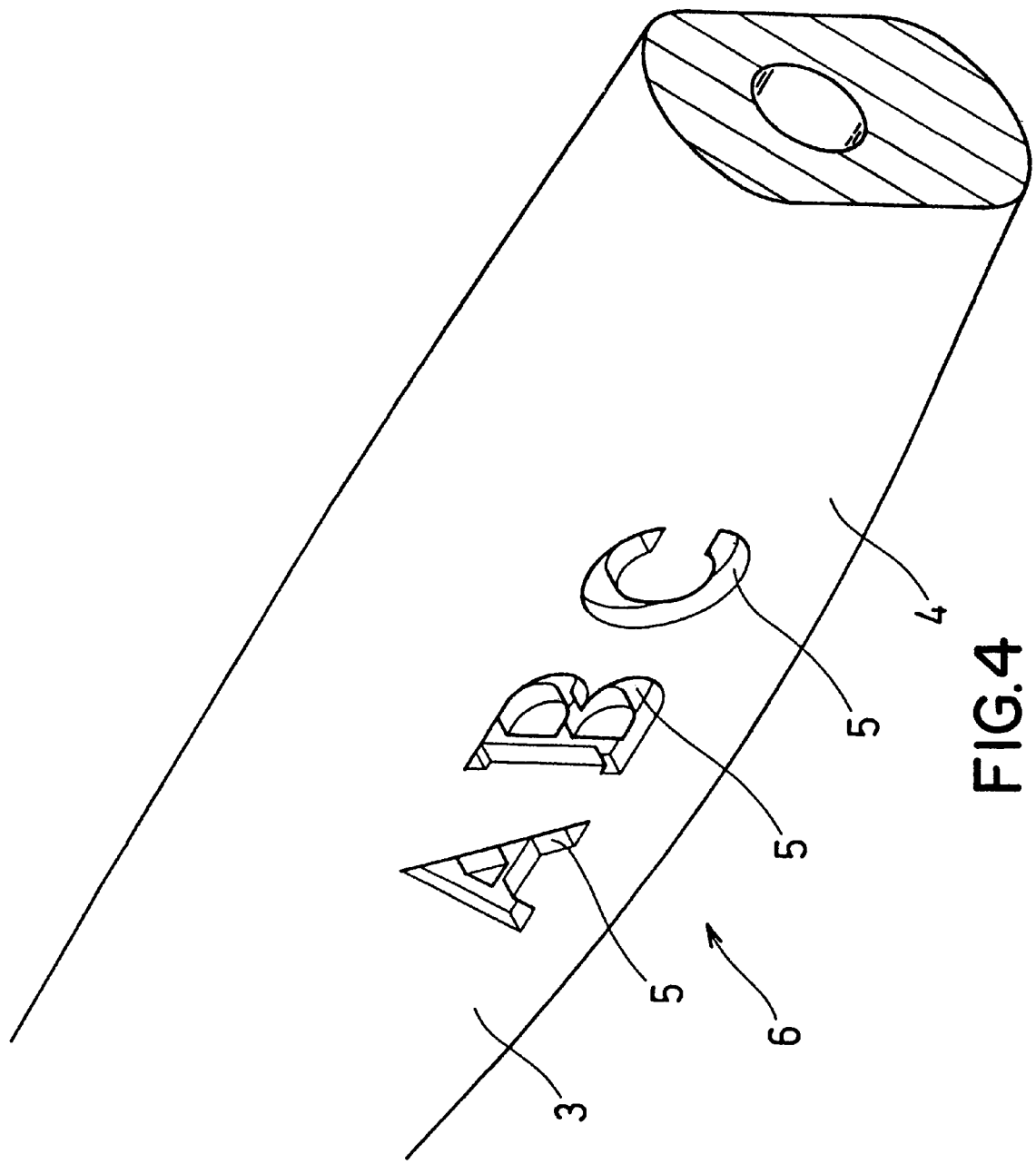
FIG. 4 is a perspective view of a part of the modern eyeglass element.

The method of manufacturing such a decorative modern element according to this invention is as follows. First of all, the modern element 3, for example, shown in FIG. 3 is molded with such plastics as nylon, cellulose acetate, cellulose acetate propionate. The plastic to be used in the embodiment may be opaque, transparent or translucent. Use of transparent or translucent plastic in particular is preferable, because the impression of wooden-looking of the modern element can be more emphasized.

As shown in FIGS. 1 through 5, for example, a solid or three-dimensional decorative portion 6 such as trademarks, which consists of concaved portions 5 having a depth of about 0.5 mm, is formed on a cut or shaved off portion 12 on an outer side 4 of the modern element, which portion 12 will be referred to hereinafter. The solid decorative portion 6 is formed at the time when the modern element is molded, or formed by impressing seals on the molded modern element.

Then, a whole surface of the above-mentioned modern element 3 is dyed black using dispersing dye. In the embodiment, the black includes not only black, but also those colors that look blackish such as reddish black, bluish black, and so on, as mixing black and other colors.

Figure 5:
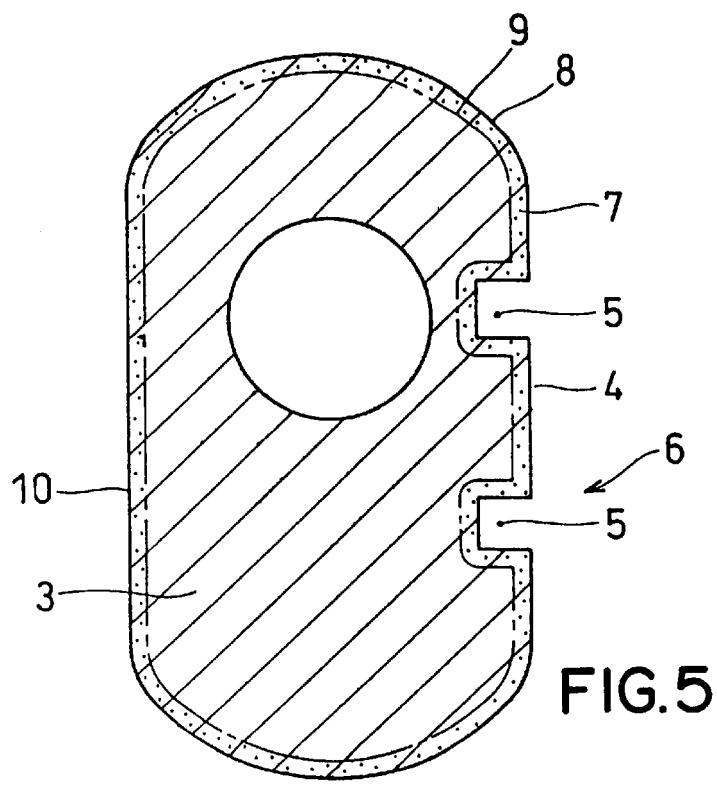
FIG. 5 is a sectional view of the modern element dyed by a first dying step.

A changed color area 7 dyed by a first dyeing step is a section between a surface of the modern element 8 and a dividing dotted line 9, as shown in FIG. 5, the depth of the changed color area 7 is within a range of about 0.1~0.13 mm from the surface of the modern element 8, for example, and is shown by the dotted area in FIG. 5. The solid decorative portion 6 consisting of the concaved portion is colored black by this dye.

Figure 6:
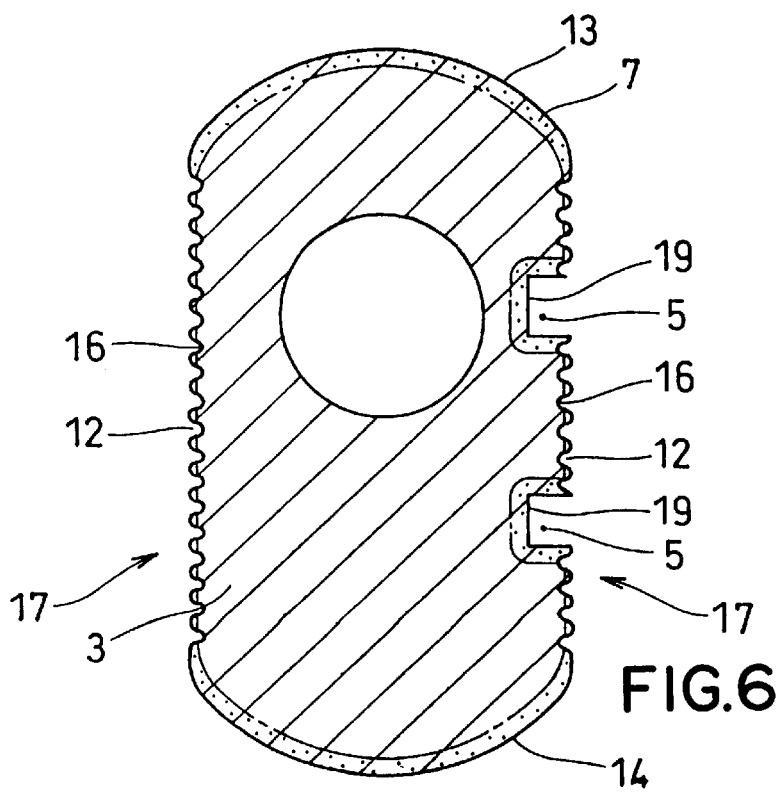
FIG. 6 is a sectional view of the modern element showing a state that the surface of the eyeglass element dyed by a first dyeing step, is cut and shaved off partially so as to form an aggregated groove pattern on the cut surface.
Figure 7:
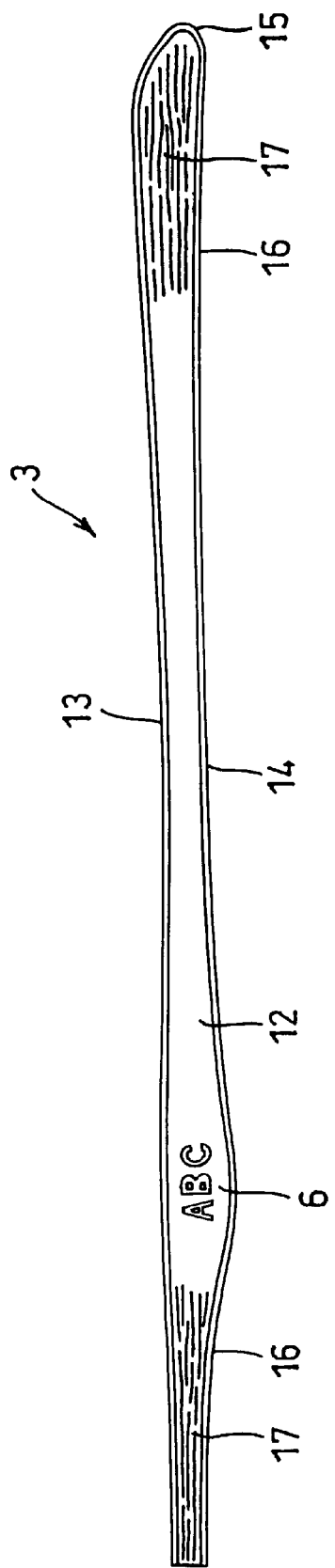
FIG. 7 is a side view of the modern element.

Thereafter, as shown in FIGS. 6 and 7, an inner side 10 and an outer side 4 of the dyed modern element, is cut or shaved off along the whole length of the modern element by using a rotary brush to which a grinder is adhered to the tip portions of the brush. This operation is carried out by gripping the modern element and contacting the rotary brush therewith. The shaved-off portion is shown in FIG. 6 and 7 with a numeral 12. As the result, upper and lower edge portions 13 and 14 and a rear edge portion 15 are left in such a state that they are dyed in blackish color. The shaved-off portion is carried out to cut and remove away the surface of the modern element in a depth of about 0.08~0.1 mm, and at the same time, a number of minute grooves 16, are shaved off in parallel with one another in the longitudinal direction of the modern element, to form its glen having a depth of about 0.05~0.1 mm, by using the cutting function of the grinder.

Figure 8:
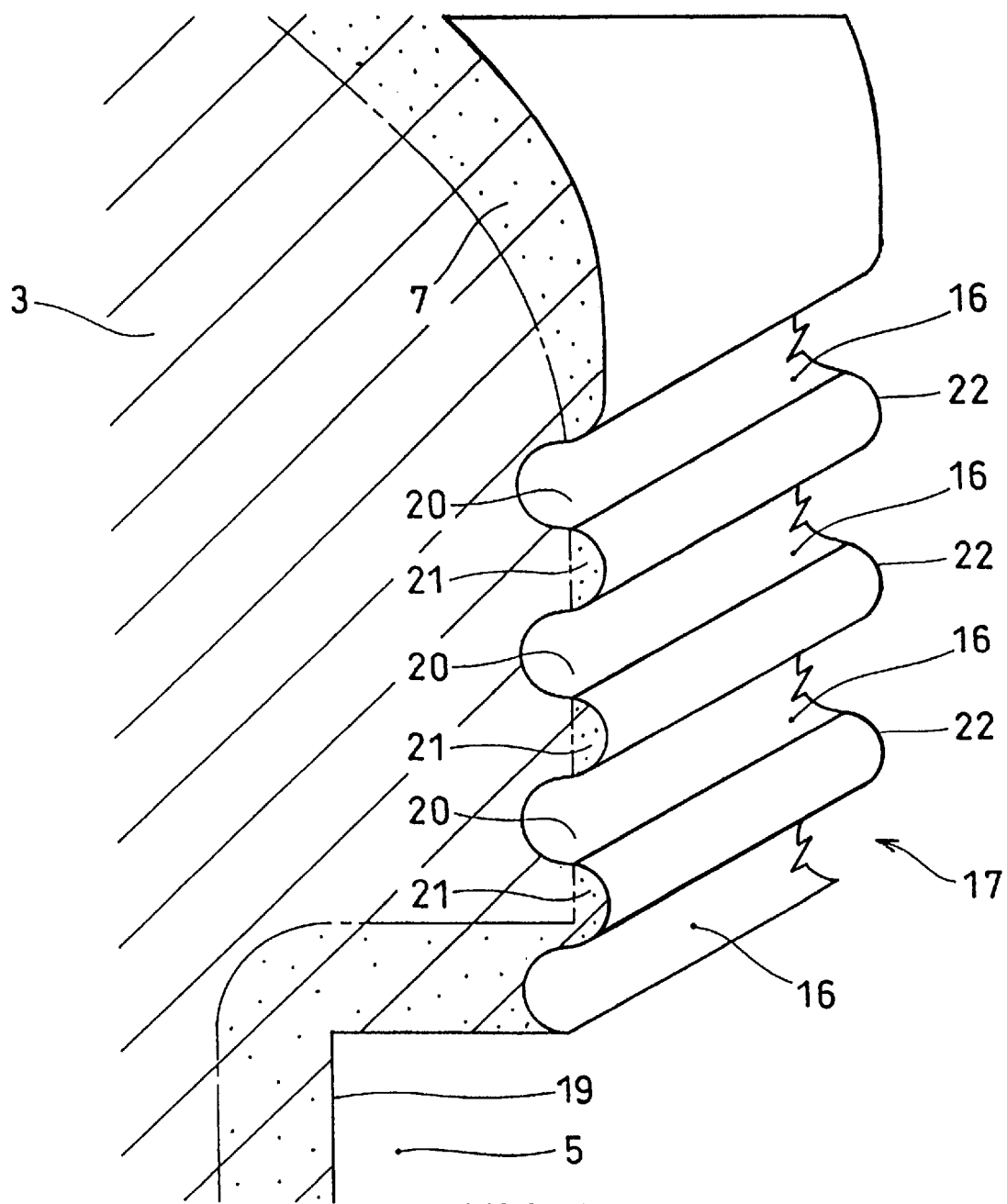
FIG. 8 is a perspective view for explaining a part of the modern element enlarged.

Thereby, as shown in FIGS. 6 through 8, for example, a stripe-aggregated groove pattern 17 may be formed. In FIG. 18, a part of the aggregated groove pattern 17 is expressed as parallel linear lines extending in right and left directions. Further, as shown in FIGS. 6 through 8, the inner side 19 of the concave 5 is left in such a state that it is dyed blackish in the beginning.

As enlargedly shown in FIG. 8, the minute grooves 16, are formed as grooves having a semicircle in section, for example. An upper portion 21 of a groove inner side 20, as formed in such a manner, maintains the blackish color by the first dyeing step, to extend in the longitudinal direction of the groove, so as to form long and continous lines 22 or short and intermittent lines 22, due to the thickness of the shaved-off and the depth of each of the minute grooves 16.

In the actual attitude of the embodiment, since the shaved-off of the modern element is carried out manually by using the rotary brush, a color changing area or the depth of each of the grooves after shaving off, is not always the same at each portion. Therefore, the width of the blackish lines 22 are not actually the same at each portion. Further, the lines 22 are sometimes long and continued or sometimes short and intermittent.

Figure 9:
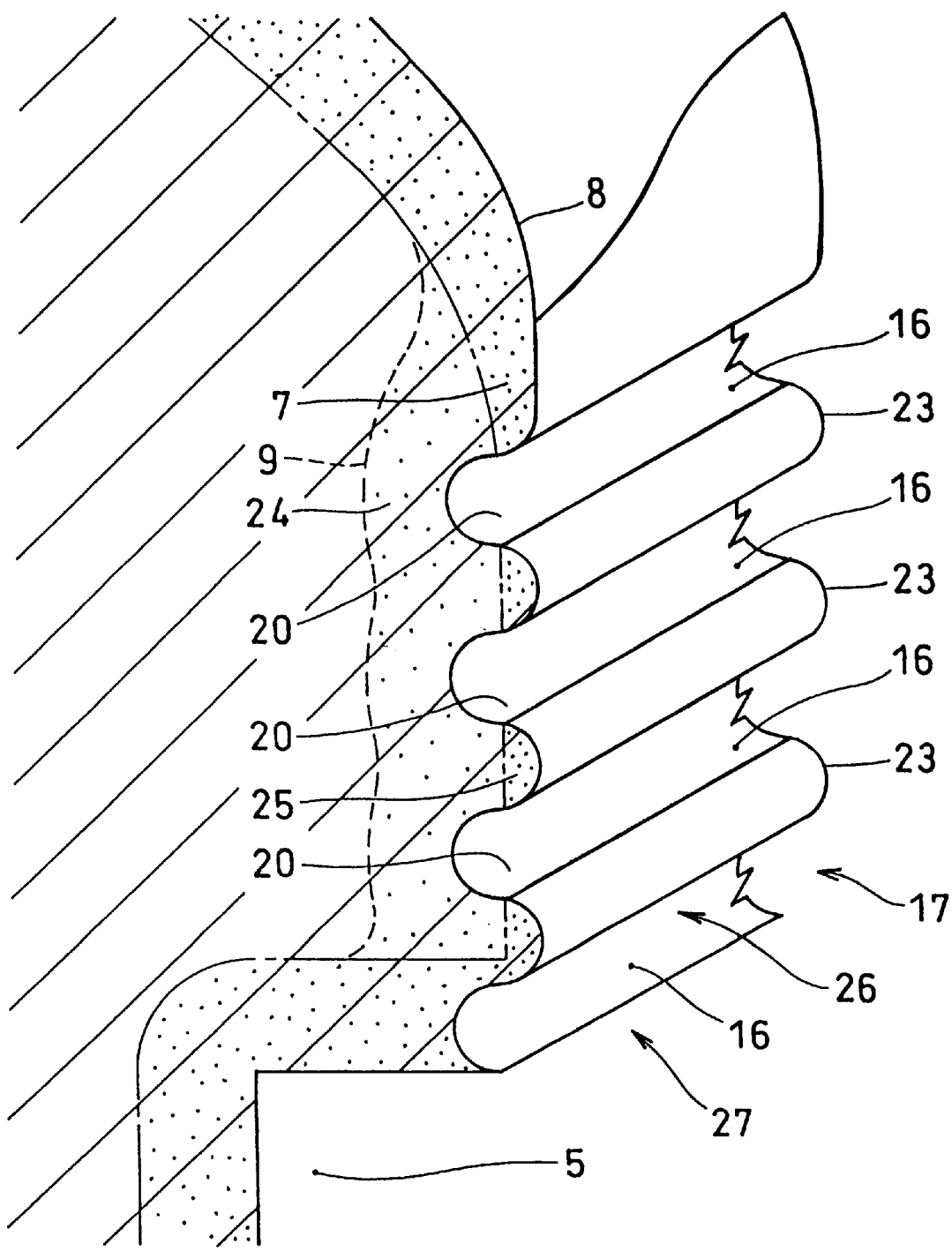
FIG. 9 is a perspective view partially enlarged, for explaining the portion dyed by a first dyeing step.

Thereafter, a whole of the modern element 3 to which the stripe-aggregated groove pattern 17 is given, is dyed for example in brownish with dispersion dye. With this second dying step, the inner side 20 of the groove is entirely dyed in brown. The portion where the blackish color is left, presents dark brown in mixing the color of the second dyeing step, and as the result as shown in FIG. 9, dark brown lines 23 (deep color lines as referred to hereinafter) may be formed clearly along the groove lines. A color change area 24 due to the second dyeing step is the portion between the surface of modern element 8 and the boundary 9 of dotted lines and shown by using dots. A section 25 of the deep color lines is shown by increasing a concentration of dots. It is possible to change, with an intention, an appearance of the stripe-aggregated groove pattern 25 of the deep lines 23, by changing the thickness of shaving off or the depth of each of the grooves, at the time of brushing by means of the rotary brush.

As the result, the stripe-aggregated groove pattern portion is expressed to have a tendency of deepness of the groove lines with the shadow generated at the bottom side of the grooves 16, so as to present an impression of grain of wood. Further, since the deep color lines 23, which are irregular in length and width, may form the stripe line pattern 26, this stripe line pattern 26 emphasizes the expression of grain of wood. Thus, it may appear a grain pattern 27 at the stripe aggregated groove pattern portion, which grain pattern is similar to an actual straight grain of wood, as is shown in FIG. 2. Due to diffused reflection of light at the minute grooves 16, softness and warmness may be given to such a portion of grain of wood.

Figure 10:
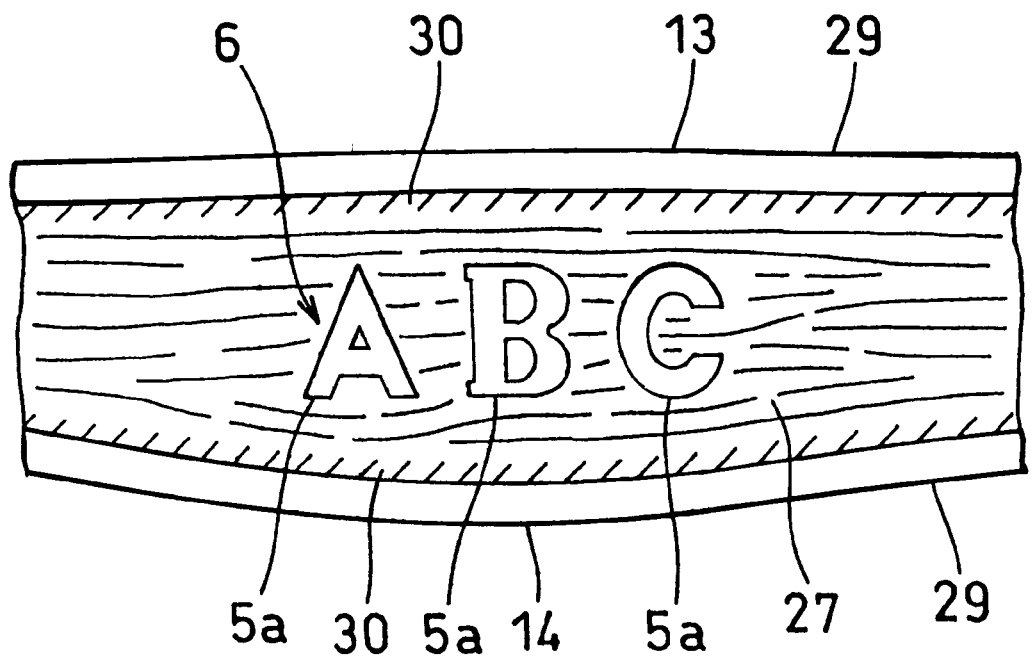
FIG. 10 is a side view showing a part of a decorative modern element partially enlarged.

Since the upper and lower portions 13 and 14 or the rear end portion 15 of the modern element are left in blackish, as mentioned above, the circumference of the portion of grain-like pattern 23 presents a hem of blackish color, as shown in FIG. 7. As shown in FIG. 10, the hem 29 looks like a bark. Therefore, the modern element can be finished similar to a wooden modern element having softness and warmness though it is made of plastics. Particularly, where the temple is made of transparent or translucent plastics as mentioned hereinbefore, the blackish hem 29 forms a shadow therein, and as the result, the inside peripheral portion 30 of the hem, as shown in FIG. 10, becomes dark slightly and the grain-like pattern 27 becomes to follow the inside of the dark portion. This is very similar to an impression of actual bark which has the outside of blackish or brownish and becomes gradually light in color inwardly. Therefore, it may emphasize an impression as if it were a wooden modern element.

The solid decorative portion 6 such as trademarks which comprise black concaves 5a, as shown in FIGS. 2, 7, and 10, appears to have one that is formed by brand, since the modern element looks like a wood as mentioned above.

Further, it is possible to maintain the wooden appearance for a long time since the grain-like pattern portion is difficult to wear its hem.

Second embodiment

Figure 11:
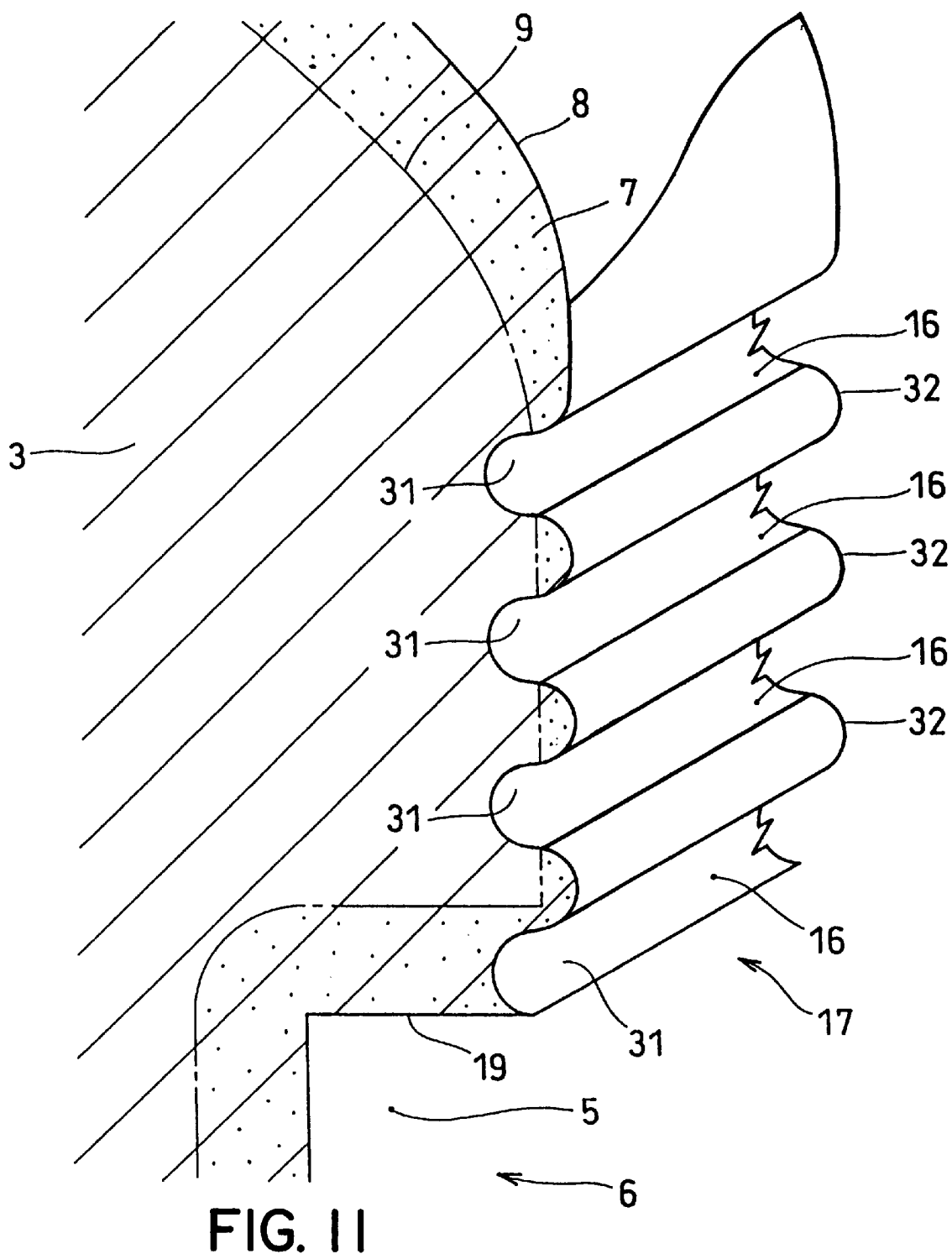
FIG. 11 is a perspective view for explaining a part of the decorative modern element partially enlarged, in which a part of the surface of the dyed portion is shaved off in a certain thickness after the first dyeing step and aggregated groove patterns are formed on the shaved surface.

FIG. 11 is for explaining another embodiment of the method of the present invention, and for example, a modern element 3 is formed by using yellowish colored plastics. In this embodiment, as described with reference to FIG. 4, a solid decorative portion 6 such as trademarks consisting of concaves 5, is formed, for example, on an outer surface 4. Thereafter, the modern element 3 is dyed in a color different from the color of the modern element such as a blackish color using dispersion dye. The cross section is substantially the same as shown in FIG. 5, and a color changing area 7 due to its dye, is between a surface 8 of the modern element and a boundary 9 of a dotted line, as shown in FIG. 11. The color changing area is shown with dots in FIG. 11.

Thereafter, the outer side and inner side of the dyed modern element are shaved off by means of a rotary brush having a grinder, as shown in FIG. 6. At the same time, a stripe-aggregated groove pattern 17 is formed, which pattern comprises minute grooves 16 flowing in the longitudinal direction of the modern element. As shown in FIG. 11, this formation of the aggregated groove pattern 17 is carried out in such a manner that yellowish lines 31 and the blackish lines 32 appear on the shaved-off surface so as to leave a blackish color of dye slightly. In this embodiment, it does not take the second dyeing step which is used in the first embodiment.

The decorative modern element obtained in such a manner, may give a soft, warm and delicate design to the modern element in combination of the shadow formed at the minute grooves 16 and diffused reflection of light caused by the minute grooves 16.

In this embodiment, since the solid decorative portion 6 such as trademarks of concaves 5, is formed on the cut portion, the inner side 19 of the concaves 5 are dyed in blackish, and therefore, it may appear the dyed solid or three dimensional decorative portion.

Other embodiments

Figure 12:
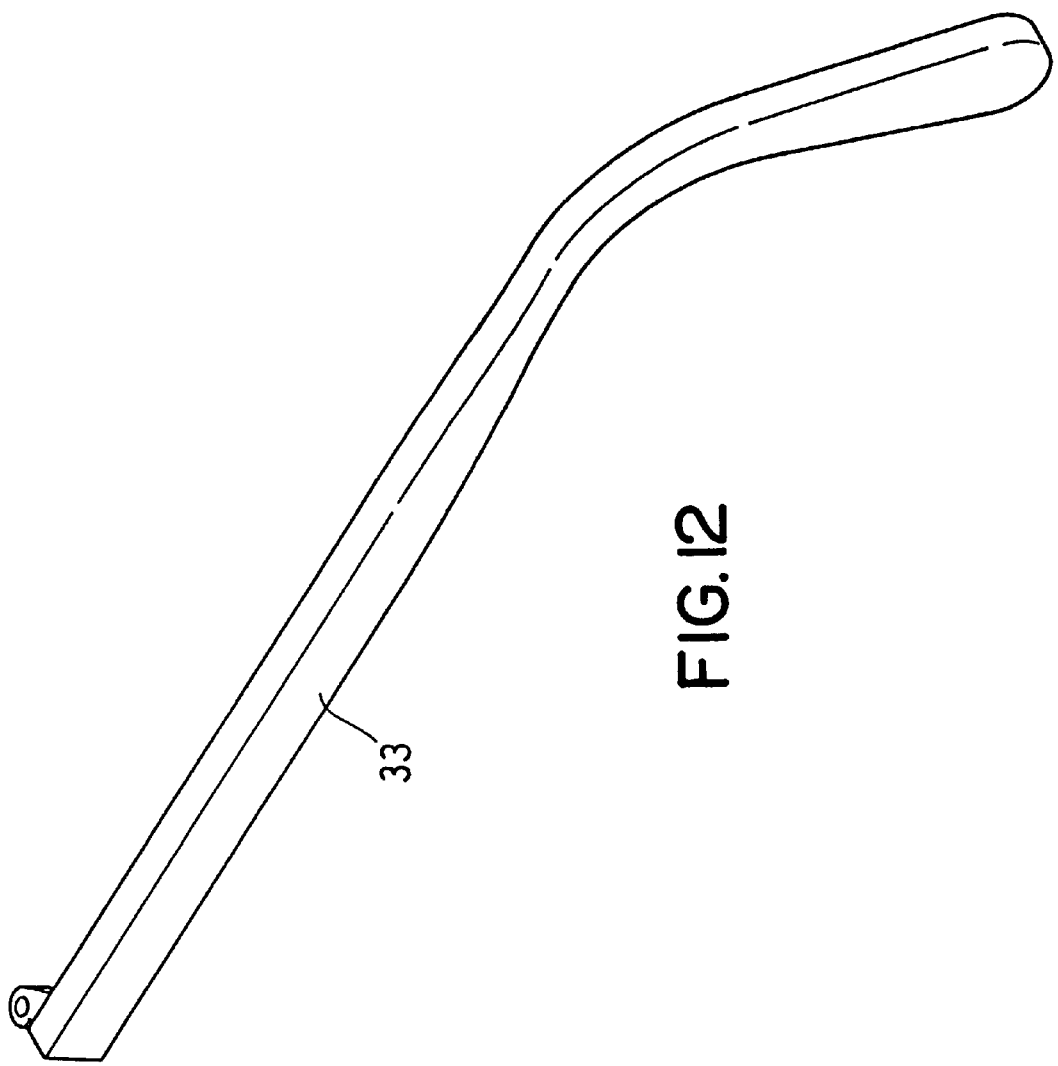
FIG. 12 is a perspective view showing a temple adopted for the method of the present invention.
Figure 13:
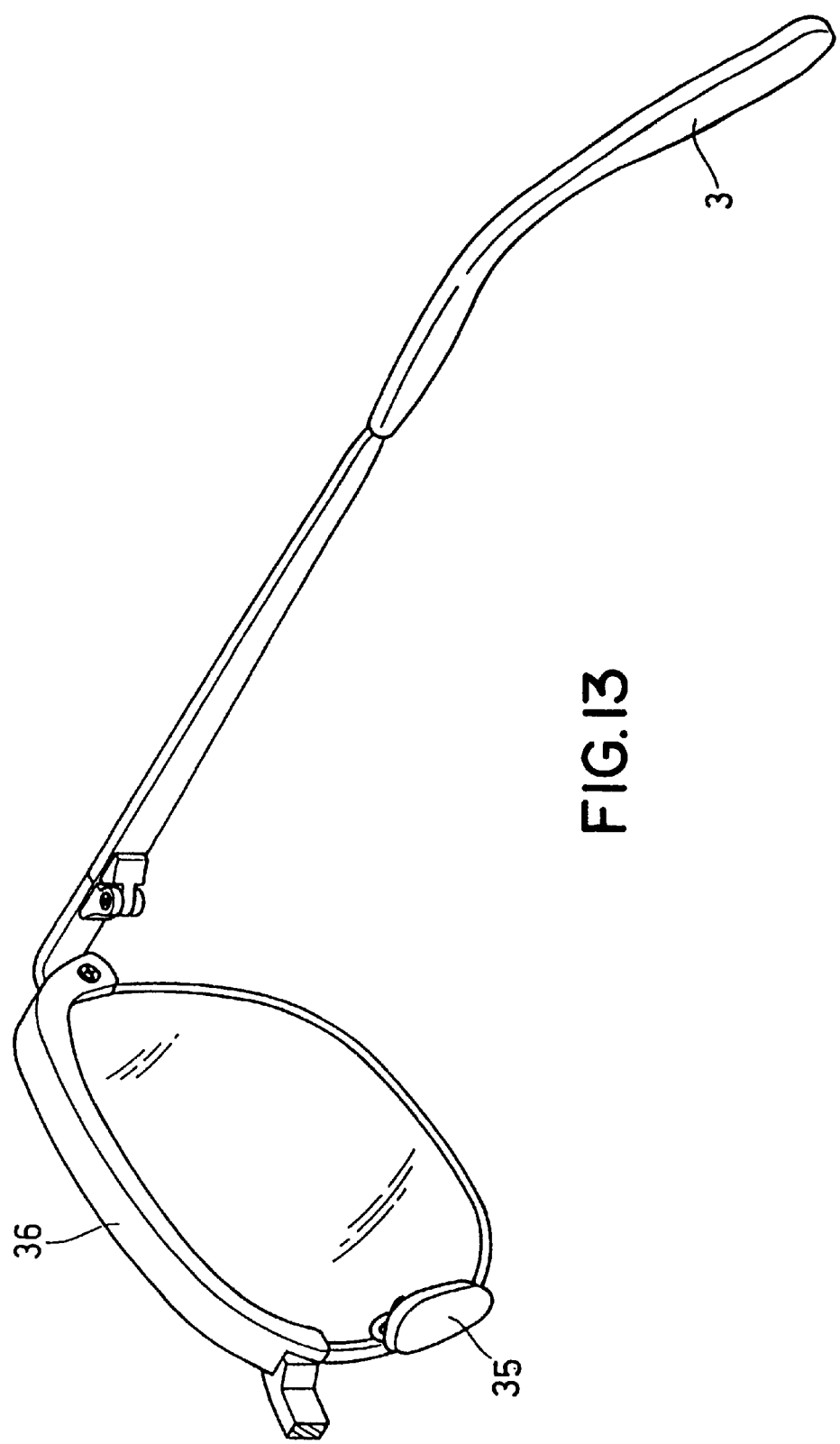
FIG. 13 is a perspective view for explaining a modification of the eyeglasses adopted for the method of the present invention.

The plastic decorative eyeglass elements according to the present invention, may adopt for a plastic temple 33 which is shown in FIG. 12, and also for a pad 35, or a top rim 36 made of plastics. Further, as shown in FIG. 13, it may adopt for such a modern element 3 which is used only for a skull temple or an anatomic temple. Furthermore, it may adopt for a rim made of plastics.

In connection with the modern element or the temple, as a manner of shaving off the dyed portion of the first dyeing step, it sometimes takes a way of shaving off the inner side thereof only, or the outer side thereof only. In this way, it may differentiate the inside or outside design of the modern element or the temple, and as the result, the designing effects of the temples (the designing effects of the outer side of the temples) at the time of wearing the eyeglasses, may be differentiated from the designing effects of the temples (the designing effects of inner side of the temples) through the lenses at the time of folding the temples, and therefore it may enjoy the difference in design.

As the attitude of cutting or shaving off the dyed portion of the first dyeing step, where the elements of the eyeglasses are for example the modern element or the temple, there is a way for shaving off the element for the entirety in the longitudinal direction thereof, as referred to hereinbefore, or a way for shaving off the front side or the rear side thereof, or a part of the middle portion thereof. Further, of sometimes of both of the upper and lower surfaces of the element or only either the upper surface or the lower surface. Furthermore, it may sometimes shave off the element in the direction of the periphery or spirally.

Such a cutting may be carried out such that the dyed portion of the first dyeing step is not left, or sometimes carried out to leave its dyed portion.

The color of dye using dispersion dye is not limited in the first and second dying steps. For example, greenish, blueish, or reddish color and the like may be adopted. Further, it may use the same colors, but they are different from each other in thickness. Particularly, where the plastic eyeglass elements are finished in wooden mode, it is the best to dye the elements with blackish color in the first dyeing step, but instead of the color, it may dye them with dark brownish color.

The step for shaving off in the first step and the step of forming the minute grooves may be carried out simultaneously by using a brush having a grinder which is shown in the above-mentioned embodiment, and further it may form the minute grooves after the shaving-off step.

Further, the minute grooves are formed in the lines which flow in the direction of an axis of the eyeglass element, but the lines may sometimes be inclined to the axis or may be crossed to the axis.

Figure 14:
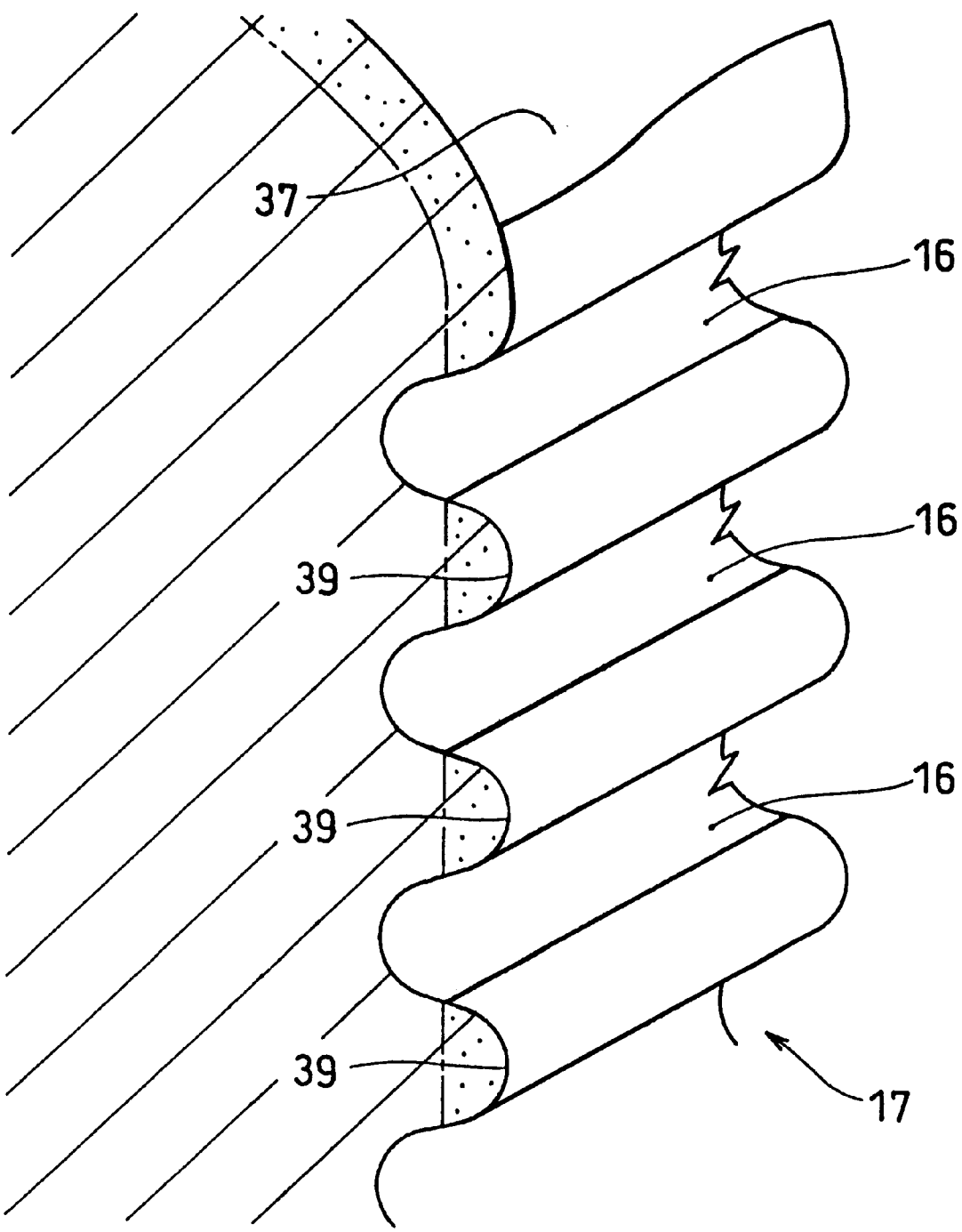
FIG. 14 is a perspective view for explaining a part of the dyed portion partially enlarged, in which a part of the surface of the dyed portion is not shaved off after the first dyeing step, but aggregated groove patterns are formed on the dye surface.

The method of the present invention may form the aggregated groove pattern 17 in such a state that the groove upper portion 39 of the minute groove 16 is in accord with the surface 37, and do not adopt such a state that the surface 37 is dyed by the first dyeing step and shaved off, as shown in FIG. 14.

The dyeing step is normally carried out by means of dip dyeing, but it may use a pressing process or a transferring process. Further, the first dyeing step may adopt only a part of the eyeglass element.

What is claimed is:

1. A method of manufacturing decorative plastic eyeglass elements comprising the steps of:

dyeing a predetermined portion of a surface of the plastic eyeglass element with a dispersion dye as a first dyeing step, forming aggregated groove patterns comprising a plurality of minute grooves formed on a part of the dyed portion of the plastic eyeglass elements, and dyeing at least the part of the aggregated groove patterns as a second dyeing step with a dispersion dye having a color which is different from the color of the dispersion dye used in the first dyeing step.

2. A method of manufacturing decorative plastic eyeglass elements as claimed in claim 1, further comprising the step of:

cutting and removing a part of the dyed surface of the plastic eyeglass element in a predetermined thickness so as to form the minute grooves on the cut surface, prior to the step of forming the aggregated groove patterns.

3. A method of manufacturing decorative plastic eyeglass elements as claimed in claim 2, wherein the thickness of cut and the depth of the minute groove are determined such that a color of the first dyeing step is left shallow and continuously or intermittently in a longitudinal direction of the groove.

4. A method of manufacturing decorative plastic eyeglass elements as claimed in claim 3, wherein the dispersion dye of the first dyeing step is blackish or dark brownish and the dispersion dye of the second dyeing step is brownish.

5. A method of manufacturing decorative plastic eyeglass elements as claimed in claim 4, further comprising the steps of:

forming a solid decorative portion of concaves on the surface of the plastic eyeglass elements, prior to the first dyeing step, and dyeing the solid decorative portion of the plastic eyeglass elements, wherein a depth of each of the concaves is determined such that a bottom portion of the concave is left after forming the minute grooves.

6. A method of manufacturing decorative plastic eyeglass elements as claimed in claim 3, wherein the plastic eyeglass element is formed with transparent or translucent materials.

7. A method of manufacturing decorative plastic eyeglass elements as claimed in claim 6, further comprising the steps of:

forming a solid decorative portion of concaves on the surface of the plastic eyeglass elements, prior to the first dyeing step, and dyeing the solid decorative portion of the plastic eyeglass elements, wherein a depth of each of the concaves is determined such that a bottom portion of the concave is left after forming the minute grooves.

8. A method of manufacturing decorative plastic eyeglass elements as claimed in claim 3, further comprising the steps of:

forming a solid decorative portion of concaves on the surface of the plastic eyeglass elements, prior to the first dyeing step, and dyeing the solid decorative portion of the plastic eyeglass elements, wherein a depth of each of the concaves is determined such that a bottom portion of the concave is left after such that a bottom of the concave is left after forming the minute grooves.

9. A method of manufacturing decorative plastic eyeglass elements as claimed in claim 2, wherein the dispersion dye of the first dyeing step is blackish or dark brownish and the dispersion dye of the second dyeing step is brownish.

10. A method of manufacturing decorative plastic eyeglass elements as claimed in claim 9, wherein the plastic eyeglass element is formed with transparent or translucent materials.

11. A method of manufacturing decorative plastic eyeglass elements as claimed in claim 10, further comprising the steps of:

forming a solid decorative portion of concaves on the surface of the plastic glass elements, prior to the first dyeing step, and dyeing the solid decorative portion of the plastic eyeglass elements, wherein a depth of each of the concaves is determined such that a bottom portion of the concave is left after forming the minute grooves.

12. A method of manufacturing decorative plastic eyeglass elements as claimed in claim 9, further comprising the steps of:

forming a solid decorative portion of concaves on the surface of the plastic eyeglass elements, prior to the first dyeing step, and dyeing the solid decorative portion of the plastic eyeglass elements, wherein a depth of each of the concaves is determined such that a bottom portion of the concave is left after forming the minute grooves.

13. A method of manufacturing decorative plastic eyeglass elements as claimed in claim 2, wherein the plastic eyeglass element is a temple and an outer side and/or inner side is cut away partially, and the minute grooves extend in the longitudinal direction of the temple.

14. A method of manufacturing decorative plastic eyeglass elements as claimed in claim 13, wherein the plastic eyeglass element is formed with transparent or translucent materials.

15. A method of manufacturing decorative plastic eyeglass elements as claimed in claim 14, further comprising the steps of:

forming a solid decorative portion of concaves on the surface of the plastic eyeglass elements, prior to the first dyeing step, and dyeing the solid decorative portion of the plastic eyeglass elements, wherein a depth of each of the concaves is determined such that a bottom portion of the concave is left after forming the minute grooves.

16. A method of manufacturing decorative plastic eyeglass elements as claimed in claim 2, wherein the plastic eyeglass element is a modern element and an outer side and/or inner side is cut away partially, and the minute grooves extend in the longitudinal direction of the modern element.

17. A method of manufacturing decorative plastic eyeglass elements as claimed in claim 16, wherein the plastic eyeglass element is formed with transparent or translucent materials.

18. A method of manufacturing decorative plastic eyeglass elements as claimed in claim 17, further comprising the steps of:
  forming a solid decorative portion of concaves on the surface of the plastic eyeglass elements, prior to the first dyeing step, and
  dyeing the solid decorative portion of the plastic eyeglass elements,
  wherein a depth of each of the concaves is determined such that a bottom portion of the concave is left after forming the minute grooves.

19. A method of manufacturing decorative plastic eyeglass elements as claimed in claim 2, wherein the plastic eyeglass element is formed with transparent or translucent materials.

20. A method of manufacturing decorative plastic eyeglass elements as claimed in claim 19, further comprising the steps of:
  forming a solid decorative portion of concaves on the surface of the plastic eyeglass elements, prior to the first dyeing step, and
  dyeing the solid decorative portion of the plastic eyeglass elements,
  wherein a depth of each of the concaves is determined such that a bottom portion of the concave is left after forming the minute grooves.

21. A method of manufacturing decorative plastic eyeglass elements as claimed in claim 2, further comprising the steps of:
  forming a solid decorative portion of concaves on the surface of the plastic eyeglass elements, prior to the first dyeing step, and
  dyeing the solid decorative portion of the glass elements,
  wherein a depth of each of the concaves is determined such that a bottom portion of the concave is left after forming the minute grooves.

22. A method of manufacturing decorative plastic eyeglass elements as claimed in claim 1, wherein the dispersion dye of the first dyeing step is blackish or dark brownish and the dispersion dye of the second dyeing step is brownish.

23. A method of manufacturing decorative plastic eyeglass elements as claimed in claim 22, wherein the plastic eyeglass element is formed with transparent or translucent materials.

24. A method of manufacturing decorative plastic eyeglass elements as claimed in claim 23, further comprising the steps of:
  forming a solid decorative portion of concaves on the surface of the plastic eyeglass elements, prior to the first dyeing step, and
  dyeing the solid decorative portion of the plastic eyeglass elements,
  wherein a depth of each of the concaves is determined such that a bottom portion of the concave is left after forming the minute grooves.

25. A method of manufacturing decorative plastic eyeglass elements as claimed in claim 22, further comprising the steps of:
  forming a solid decorative portion of concaves on the surface of the plastic eyeglass elements, prior to the first dyeing step, and
  dyeing the solid decorative portion of the plastic eyeglass elements,
  wherein a depth of each of the concaves is determined such that a bottom portion of the concave is left after forming the minute grooves.

26. A method of manufacturing decorative plastic eyeglass elements as claimed in claim 1, further comprising the steps of:
  forming a solid decorative portion of concaves on the surface of the plastic eyeglass elements, prior to the first dyeing step, and
  dyeing the solid decorative portion of the eyeglass elements,
  wherein a depth of each of the concaves is determined such that a bottom portion of the concave is left after forming the minute grooves.

27. A method of manufacturing decorative plastic eyeglass elements comprising the steps of:
  dyeing a predetermined portion of a surface of the plastic eyeglass element with a dispersion dye as a first dyeing step, and
  forming aggregated groove patterns comprising a plurality of minute grooves formed on a part of the dyed portion,
  wherein a depth of each of the minute grooves is determined such that a bottom portion of the groove is located along a portion of the element which is not dyed.

28. A method of manufacturing decorative plastic eyeglass elements as claimed in claim 27, wherein the plastic eyeglass element is formed with transparent or translucent materials.

* * * * *